Oct. 7, 1969 R. L. KEPLER 3,471,049
HOIST FOR HOISTING STACKED ANNULAR ARTICLES
Filed Oct. 24, 1967 6 Sheets-Sheet 5

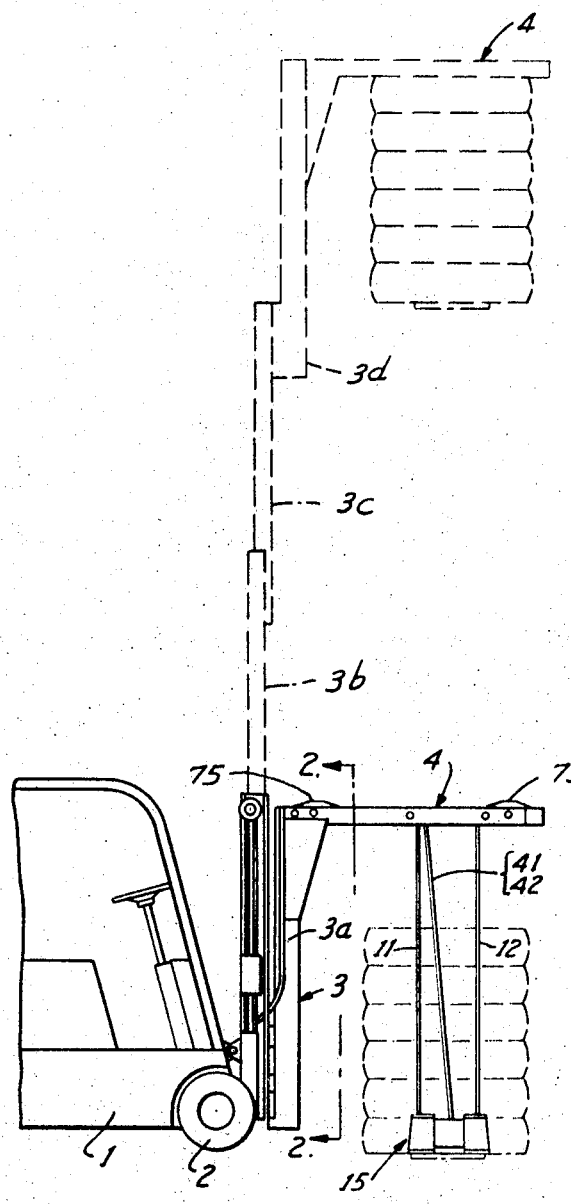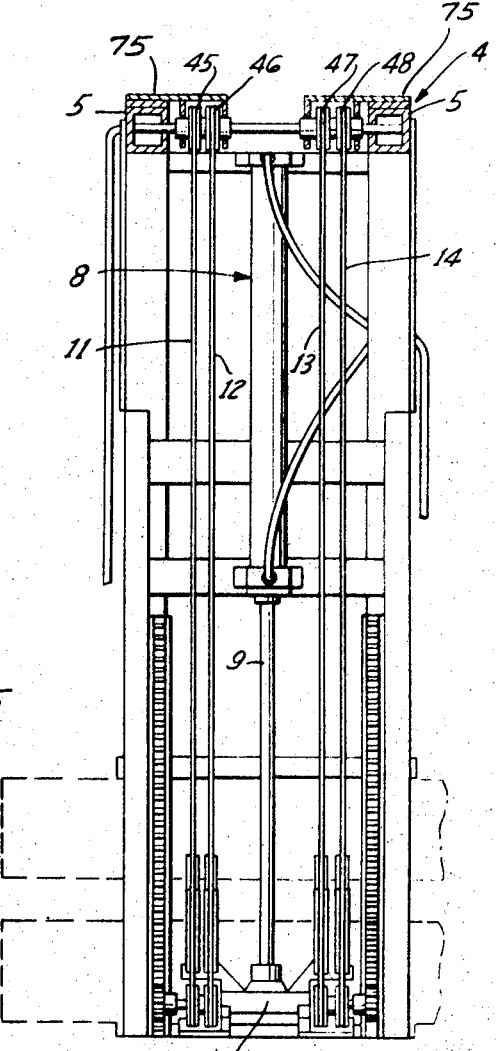

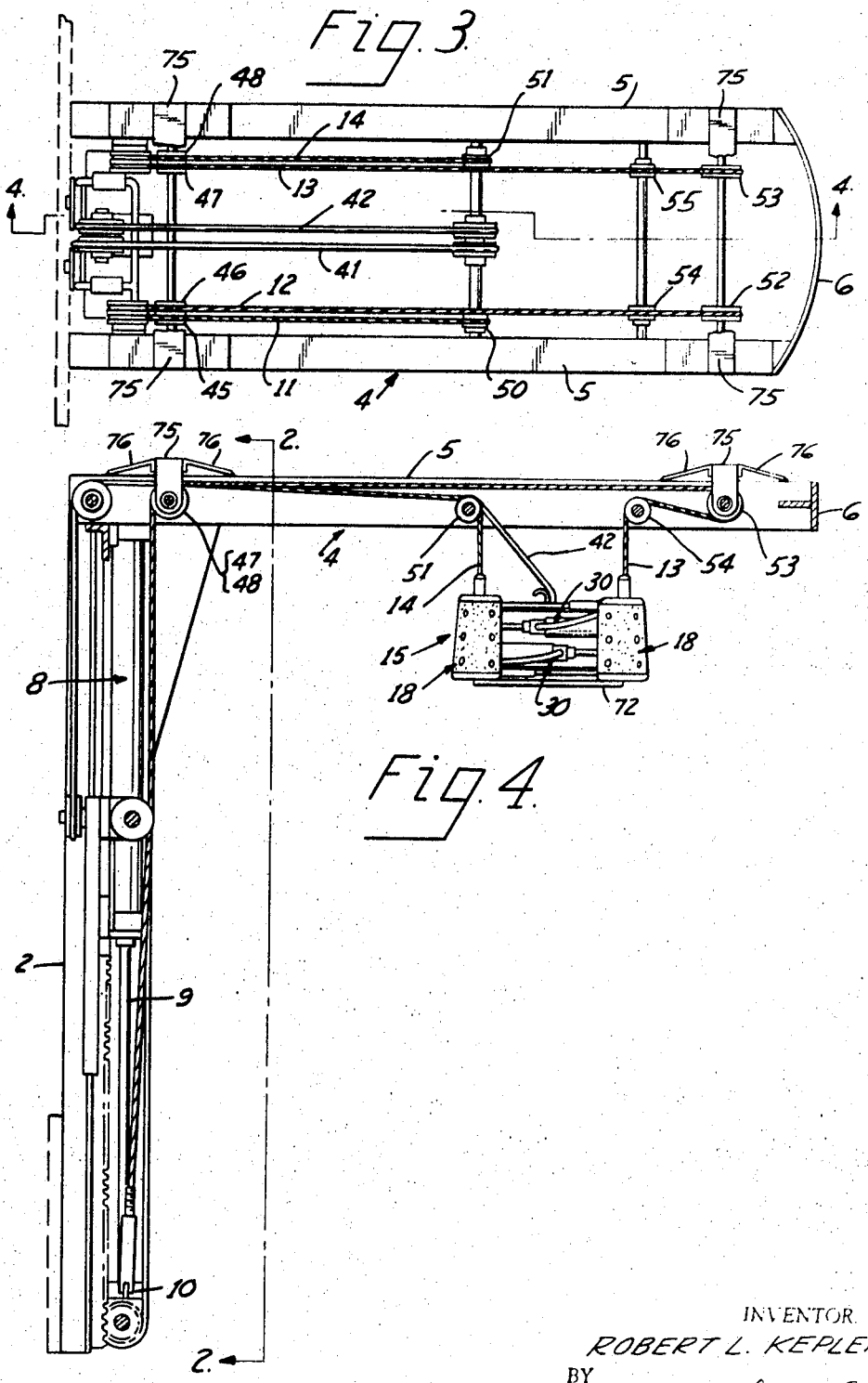

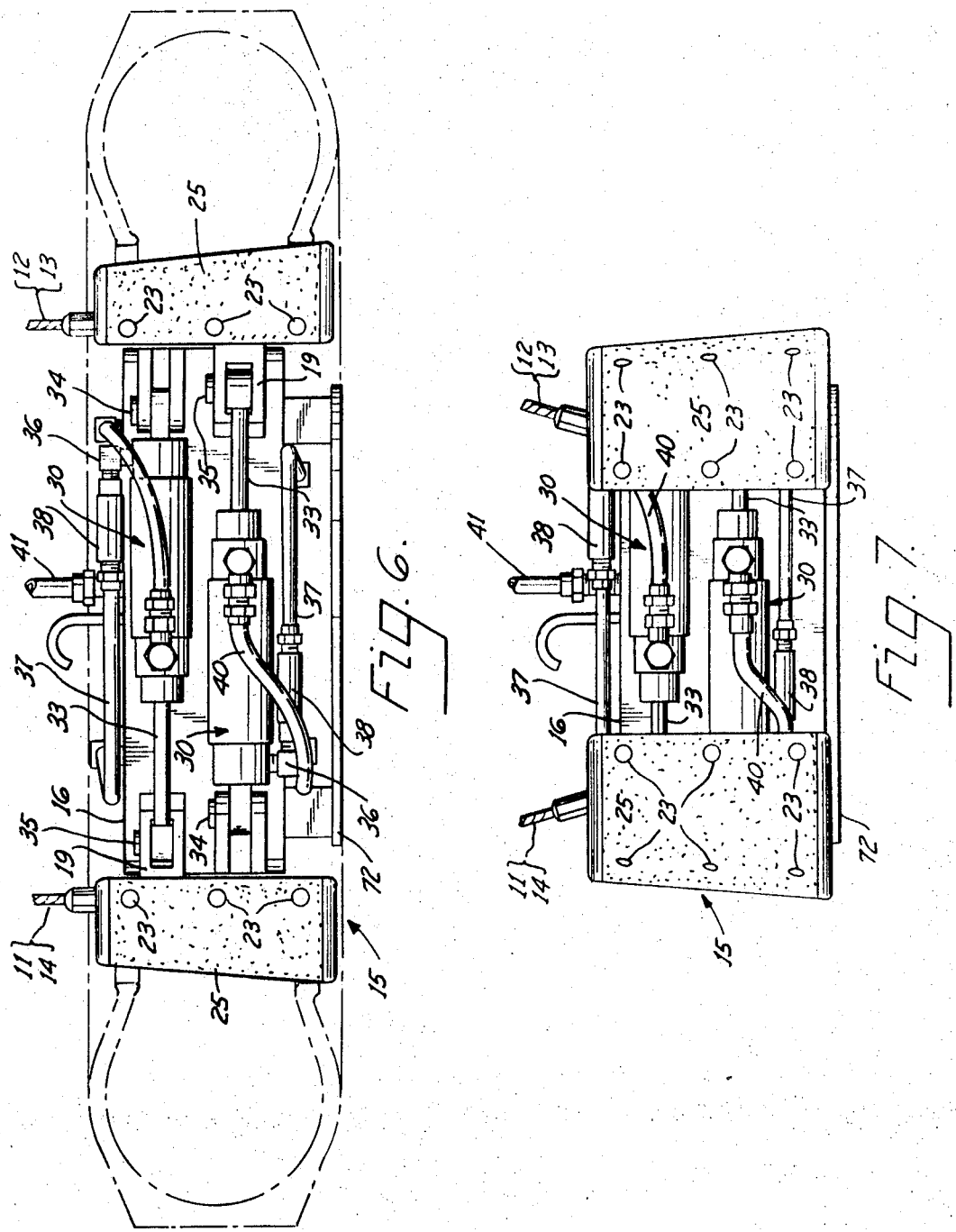

INVENTOR.
ROBERT L. KEPLER
BY
ATTORNEY.

United States Patent Office 3,471,049
Patented Oct. 7, 1969

3,471,049
HOIST FOR HOISTING STACKED ANNULAR ARTICLES
Robert L. Kepler, Uniontown, Ohio, assignor to Morrison Company, Cleveland, Ohio, a corporation of Ohio
Filed Oct. 24, 1967, Ser. No. 677,581
Int. Cl. B66f *9/18;* B66c *1/10;* B25b
U.S. Cl. 214—653                                        5 Claims

ABSTRACT OF THE DISCLOSURE

The present invention relates to an industrial lift truck with an overhanging support from which is suspended by hoist cables an expansible and contractible lift head which can be lowered in contracted condition into the central passage of a stack of tires and then expanded for gripping a selected tire and hoisting it, and thereby the tires resting on it, the head comprising four shoes disposed about an upright central axis and movable toward and away therefrom to contracted and expanded positions, respectively, the outer gripping faces of the shoes being curvilinear in a direction generally circumferentially of the axis and convex outwardly, and the head suspending cables being connected to the shoes, respectively, for moving inwardly and outwardly therewith;
characterized in that the gripping face of each shoe slopes outwardly at about five degrees to the central axis from its upper edge to its lower edge;
the gripping faces are covered with relatively stiff, but resilient rubber;
the cables are connected to the shoes so as to eliminate twisting stresses on the cables during movement of the shoes to gripping and releasing positions, and
the shoes are constrained to recede from the central axis concurrently all at the same rate.

---

This invention is directed to apparatus for lifting and conveying stacks of annular articles, such as stacks of automobile tire casings, and is an improvement on the invention disclosed in U.S. Letters Patent No. 3,195,751, to E. H. Meyers and Robert L. Kepler, issued Jan. 20, 1965.

As more fully disclosed in the patent, the invention is incorporated in a conventional industrial lift truck which, instead of having lift forks at the base of the mast, has an overhead rigid boom or support from which a hoisting head is suspended by cables.

The head comprises a central body and a plurality of radially movable shoes operated from retracted to expanded position by suitable hydraulic piston and cylinder assemblages, and is arranged to be lowered through the aligned central openings of a stack of tires until resting on the floor on which the stack of tires is supported, and then expanded for gripping the bottom tire.

The shoes are provided at the base with radial horizontal flanges which, upon movement of the shoes to expanded position, are to engage beneath the lowermost bead of the bottom tire. The flanges, coupled with the frictional resistance of the shoes against the inner periphery of the beads, secure the tires in a stack and lift the bottom tire and thereby the superposed stack. The suspending cables are connected to the shoes so that, upon movement of the shoes to gripping position, the cables engage the inner peripheries of the tires and help align the tires vertically and hold them in a properly stacked relation during hoisting and transporting. The foregoing prior structure is disclosed in the above patent.

It has been found that, on occasion, the flanges at the bottom of the shoes of the prior structure engage and scuff the beads of the bottom tires. Furthermore, in the case of tube tires, the flanges sometimes pinch the tube or stress the valve stem into an unnatural position and damage it or the tube. Again, much of the lifting force depends upon the flanges being properly engaged with the underside of the lowermost bead of the bottom tire or tire selected to be the bottom tire on the hoist head. Since ordinarily the head cannot be observed readily in loading position, it may become misaligned or tilted. This could cause the flanges to dig into the beads or to fail to engage the underside of the lower bead of the selected bottom tire, or cause the flanges of some shoes to engage beneath the bottom bead and some to dispose their flanges within the bottom tire.

Further, in the prior structure, the outer surfaces of the shoes are metal which sometimes scuffs the inner periphery of the beads.

Since the shoes operate at varying distances from the overhead boom and at different expanded and contracted positions, depending upon size of the central opening of the tires, the cables of the prior structure were subjected to repeated twisting and flexure which caused fatigue of the cable strands and shortened the useful life of the cables. Again, the power means for moving the shoes to expanded position did not control the movement so that all shoes moved concurrently at the same rate. This sometimes resulted in undesirable shifting of the head shoes during engagement of the shoes and tires, with resultant scuffing of the beads.

In accordance with the present invention, the flanges at the bottom of the shoes are eliminated, the shoe surfaces are circumferential segments of a conical frustum arranged with the larger bases at the bottom so that each shoe is convex and curvilinear outwardly and circular in horizontal cross section, and with a slope of about five degrees from its lower end to its upper end. Furthermore, the surfaces of the shoes which engage the tire are covered with rubber, vinyl, or like material which is relatively stiff, but nonetheless has appreciable resiliency. Such material provides a better frictional grip of the tire and does not scuff the inner periphery of the beads and, being free of flanges, cannot damage the lowermost bead of the bottom tire due to misalignment.

The cables are fastened to the shoes for swiveling about upright axes and for rocking about horizontal axes in each instance so that they are not respectively twisted and stressed at their connection with the shoes.

The sheaves for the cables are so arranged as to provide a more nearly vertical position for the cables in all raised and lowered positions of the shoes or hoist. The cables are confined, where they pass over their sheaves, by suitable guards which also serve as ramps to prevent damage to the ceiling of the trailer and its cross beams or damage to the cables should the boom be raised too high during operation or transport.

Other objects and advantages of the present invention will become apparent from the following description wherein reference is made to the drawings, in which:

FIG. 1 is a diagrammatical side elevation of a lift truck embodying the principles of the present invention;

FIG. 2 is an enlarged vertical sectional view of part of the mast and boom of the present invention taken on line 2—2 of FIGS. 1 and 4;

FIG. 3 is an enlarged top plan view of the mast and boom with the features of the present invention installed;

FIG. 4 is an enlarged sectional vertical view of the mast and boom showing the hoist dependent from the boom, and is taken on line 4—4 of FIG. 3;

FIG. 6 is a side elevation of the hoist illustrated in FIG. 5 with the shoes in expanded position;

FIG. 7 is a view similar to FIG. 6 showing the shoes of the hoist in contracted position;

Figure 5:
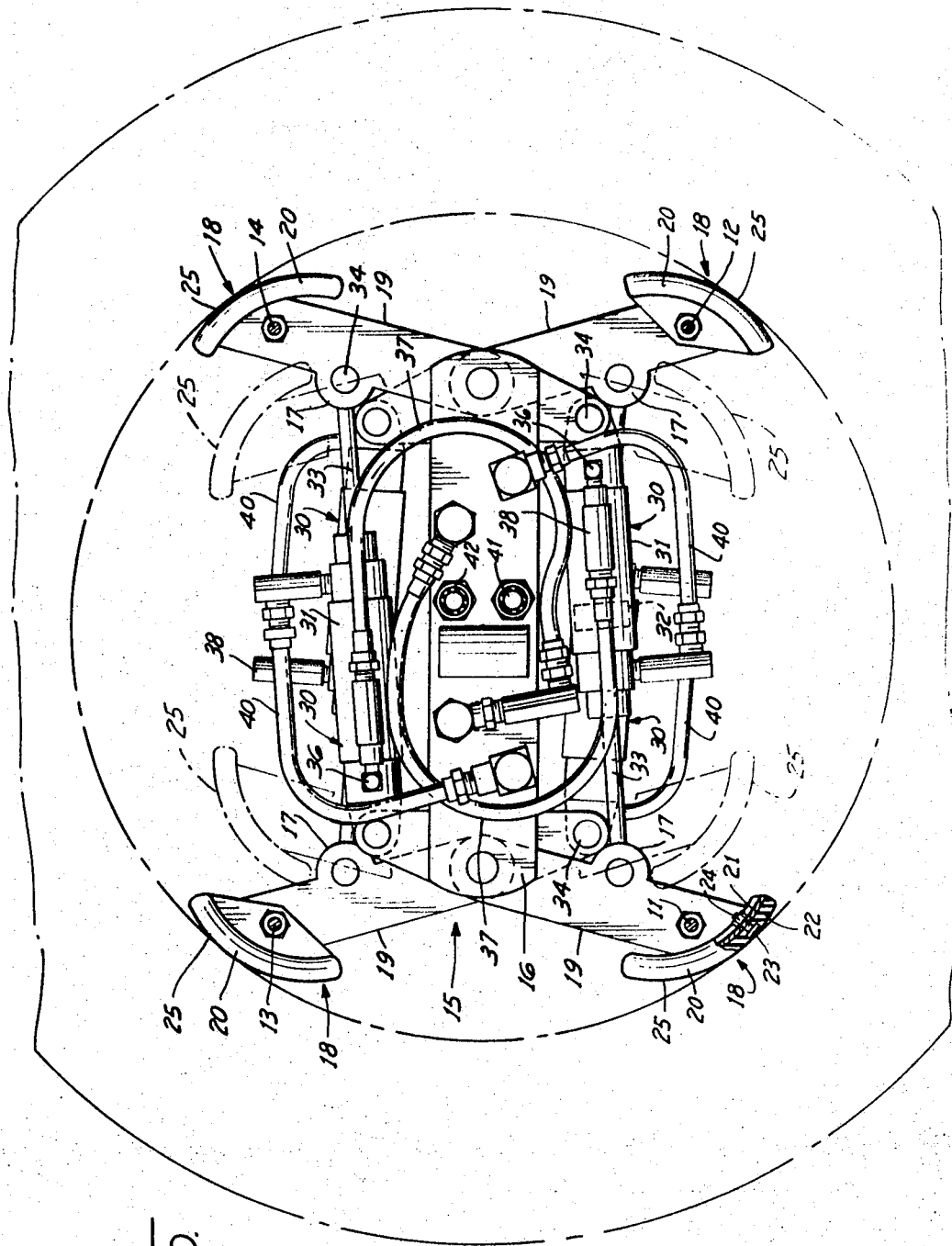
FIG. 5 is an additionally enlarged top plan view of the hoist and the operating cables therefor showing the shoes in expanded position.
Figure 8:
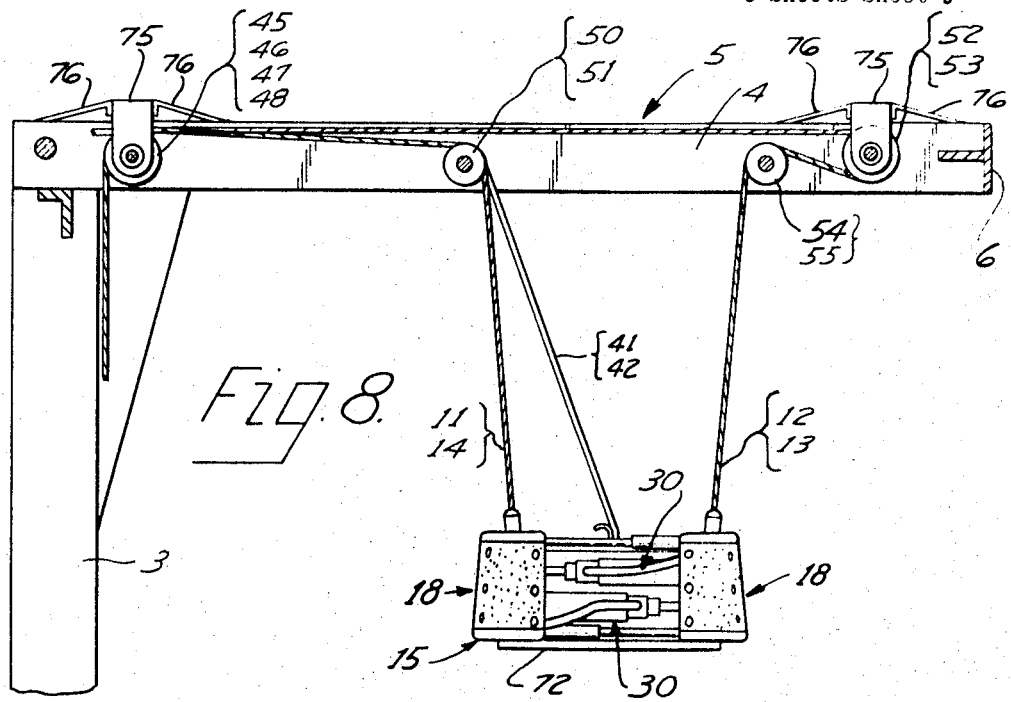
FIG. 8 is a fragmentary side elevation of the boom and part of the mast showing the sheaves for the cables of the hoist head.
Figure 9:
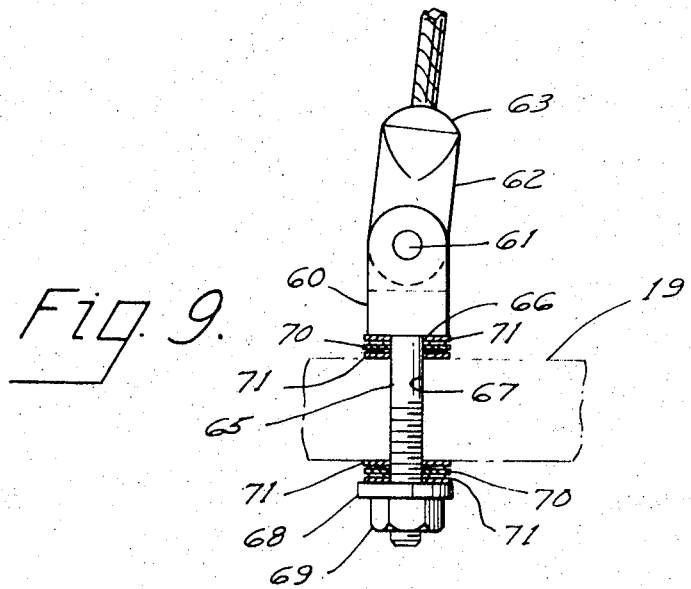
FIG. 9 is an enlarged fragmentary vertical sectional view of a part of the shoe showing the manner of connecting the associated cable thereto.

The present invention is shown as embodied in a conventional lift truck having the usual chassis 1, power driven wheels 2, and a mast 3. The mast is comprised of sections 3a, 3b, 3c, and 3d, respectively, and can be extended and retracted telescopically by suitable power means in a conventional manner as disclosed in the above patent. The topmost mast element 3d carries a horizontal boom 4 which, as best illustrated in FIG. 4, comprises two transversely spaced arms 5 secured together at the forward end by a suitable bridging member 6.

Figure 10:
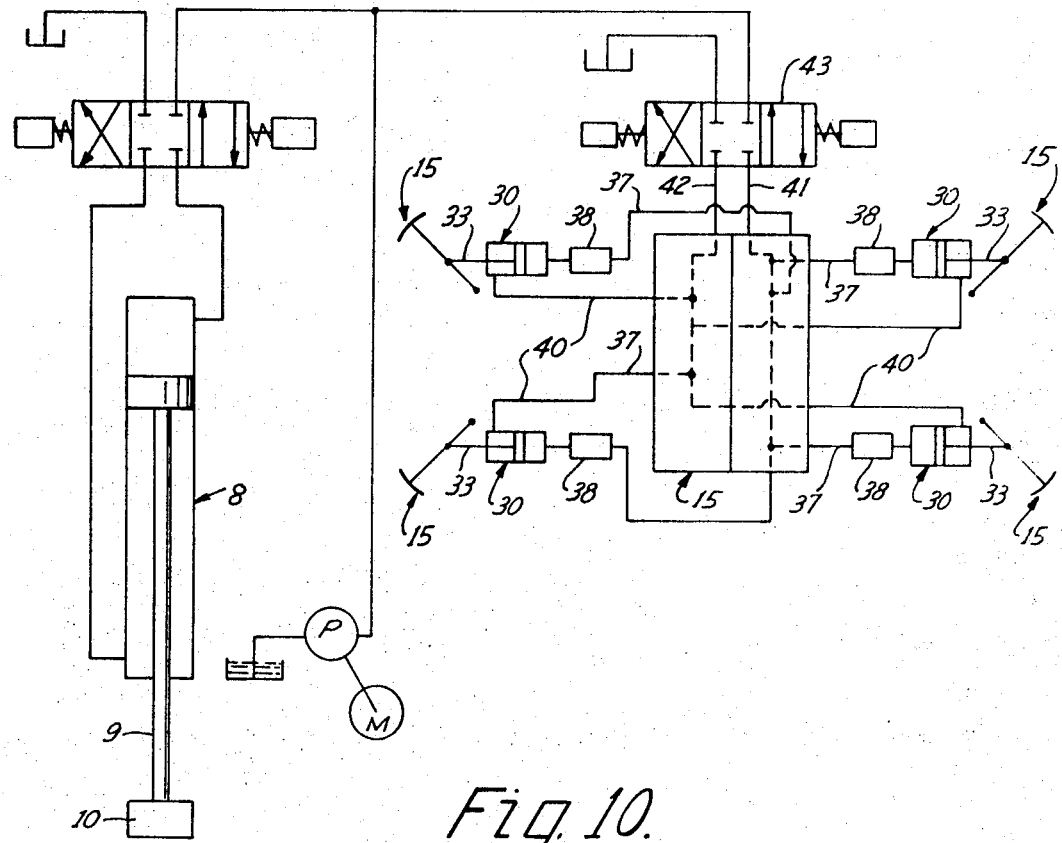
FIG. 10 is a schematic hydraulic circuit of the invention.

Mounted on the mast section 3d is a reversible hydraulic piston and cylinder assemblage 8 having a piston rod 9 drivingly connected to a cable drive head 10. The cylinder 8 is connected to a pump P, see FIG. 10, through a conventional reversing valve. Connected to the drive head 10 are four cables 11, 12, 13, and 14, respectively, which are used for lifting and lowering a hoisting head 15.

The hoisting head 15, as best illustrated in FIGS. 5 through 7, comprises a rigid body 16, which is in the form of a hollow manifold for purposes later to be described. The body or manifold 16 has yoke arms arranged in pairs, one arm of each pair above the other. Pivotally secured between the pairs of yoke arms 17, respectively, are radially outwardly extending shoes, indicated generally at 18. Each shoe includes a carrying arm 19 and a gripper 20. The arms 19 are connected to their associated yoke arms 17 by upright pivots. The grippers 20 are mounted on the outer ends of the arms 19, respectively, in fixed position thereto. Each gripper 20 comprises a metal backing plate 21 fixedly secured to its associated arm 19. Bolted on the front or outer face of each plate 21 is a gripping plate 22 which preferably is in the form of a metal plate with rubber, vinyl, or other relatively stiff, but somewhat resilient, non-metallic material vulcanized or otherwise permanently bonded to its outer face. The plates 22 carry bolts 23 which receive nuts 24 for securing the plates 22 in operating position on their backing plates 21. The outer exposed face 25 of each shoe 18 is curvilinear about the upright central axis of the head and convex outwardly. Preferably, in all horizontal sections, it is of constant radius. The face slopes outwardly at an angle of five degrees with the vertical from top to bottom. Thus, preferably, each face 25 is in the form of a conical frustum disposed with its largest diameter at the bottom and smaller diameter at the top. Consequently, when the shoes are swung outwardly by swinging the arms 19 outwardly, they present to the inner periphery of the beads of the tire in which the bead is disposed, and outwardly convex curvilinear engaging surface which slopes outwardly from the top to the bottom so that as the hoisting operation is effected with the shoes held in their outwardly extending position against the beads of the tires, the beads are held firmly by the shoes. Their own weight merely more tightly binds them against the outer faces 25 of the shoes.

For moving the shoes outwardly, each arm 19 is provided with reversible hydraulic piston and cylinder assemblage 30 comprising a cylinder 31, a piston 32, and a piston rod 33. Since the cylinders are the same in form and function, only one will be described in detail. Each cylinder 30 is pivotally connected at its head by a pivot 34 to an integral yoke on the body or manifold 16 and its rod is pivotally connected by pivot 35 to an associated arm 19. Each cylinder 31 is connected at its head end by a fitting 36 to a pressure line 37 which, through the manifold 16, leads to a source of power, such as a motor driven pump. Hydraulic flow control regulators 38 are connected between the pressure line 37 and the fitting 36. The regulators 38 are such as the same amount of hydraulic fluid is metered to all of the shoes concurrently so that each moves at the same rate from its fully retracted to its fully extended position.

Each cylinder 31 is connected at its rod end to a return line 40. The lines 37 and 40 are connected to suitable separate compartments in the manifold 16 and these compartments are connected by hoses 41 and 42 to the pressure side and return side, respectively, of a pump P through a suitable reversing valve 43, so that the arms can be moved to expanded or retracted position concurrently, respectively, by the piston and cylinder assemblages.

As mentioned, the sheaves for the shoes preferably are arranged so that the cables leading to the shoes from the boom 5 are as nearly vertical as possible at all times regardless of the raised or lowered position of the hoisting head and of the extended or retracted position of the shoes. Accordingly, the cables 11 through 14 are passed over sheaves 45, 46, 47, and 48, respectively, arranged on the boom 5 adjacent the mast. The cables 11 and 14 pass over their sheaves 45 and 48 and thence forwardly to sheaves 50 and 51, and then depend to their associated shoes on the head. In order to afford ample vertical clearance for all of the cables, the cables 12 and 13, after passing over their sheaves 46 and 47, are carried toward the outer end of the boom and thence over sheaves 52 and 53 which are at a higher level than sheaves 50 and 51, and thence over sheaves 54 and 55 which are offset from the sheaves 52 and 53 in a direction toward the mast. With this arrangement all of the cables leave the mast at the same level and can remain more nearly vertical in all raised and lowered positions, and all extended and retracted positions, of the shoes.

It is desirable that each cable be free to rock to compensate for the changing angle of the cables due to raising and lowering the head and extending and retracting the shoes. Even though the twist on the cable in the prior patent is only about one-eighth of a revolution about the cable axis from expanded to retracted position of a shoe, such repeated twisting, and flexing due to the change in angularity between the cable and shoe causes metal fatigue and damage to the cable. In order to eliminate both the rocking and the twisting, each arm 19 is provided at its outer end near the shoe with a yoke 60. Pivotally mounted by a pivot 61 between the arms of the yoke is a rocker 62 which at its outer end carries a swivel connector 63 for the cable. The connected end of the cable is fixedly secured in the connector 63. Thus, the cable will rock about the axis of the pivot 61. To compensate for the twisting of the cable about its own axis, the yoke 60 is provided with a suitable shaft 65. The underface 66 of the yoke is arranged to provide a suitable bearing shoulder. The shaft 65 extends through a suitable bore 67 in the arm 19 and at its opposite end carries a washer 68 and nut 69 so arranged that the shaft 65 can be drawn axially endwise of the bore 67 to the degree desired within the bore 69 of the arm 19. In order to assure free rotational movement of the shaft 65 about its axis, suitable sets of roller bearings 70 with the bearing races 71 are provided so that the shaft is anti-frictionally mounted within the bore 67. The shaft preferably is arranged on the outer end of the arm 19 adjacent to, but inwardly from, the outer gripping face of its associated gripper 20.

It is apparent that with the arrangement thus described, all the shoes can be drawn inwardly to fully collapsed position very readily, even though there is no metering of the fluid to the rod ends of the cylinders, and can be moved to extended position at the same rate.

In the retracted condition of the shoes, the head is lowered through a stack of tires which may be arranged approximately coaxially in an upright stack. The head is then lowered until it strikes the floor beneath the lowermost bead of the bottom tire or to a preselected tire if only part of the tires in the stack are to be moved. A suitable scuff shoe 72 is provided on the bottom of the manifold to protect the manifold, and assure the hoist rests with the axes of the shoes vertically if the head strikes the floor. In this position pressure fluid is admitted to the head ends of the cylinders 30 and due to the hydraulic flow control devices 38, all shoes swing outwardly concurrently in equal increments of movement. As a result, the hoist, if not already centered, centers within the bead of the bottom shoe and equal pressure is applied by each shoe to the inner periphery of the bead.

The supply of hydraulic fluid is maintained until all shoes are in firm frictional engagement with the inner periphery of the lowermost beads of the selected bottom tire of the stack to be lifted. Due to the frusto-conical shape of the shoes and their disposition with the larger diameter downwardly, quite obviously when hoisting starts the weight of the stack itself forces the lowermost bead of the selected bottom tire even more firmly into contact with the flexible gripping surfaces 25 of the respective shoes. The cables assume a substantially upright position and if tires of the stack are out of line the cables can shift them into coaxial relation and maintain the tires of the stack in substantially coaxial relation during hoisting. Ordinarily hoisting is continued until the top of the upper tire of the stack, or partial stack, engages firmly the underside of the boom 5. In this condition the stack can readily be transported, be hoisted by extending the mast of the lift truck, and then disposed of in the proper position. The operator has an adequate view of the stack during transportation.

It sometimes happens, however, in stacking tires close to the ceiling portions, girders or parts of the cealing will strike parts exposed at the upper face of the boom, causing damage thereto or to the ceiling, or dislodging the cables from their sheaves. To reduce this hazard, which could thus cause damage to the boom, ceiling, or parts thereof, and to assure that the cables stay within their respective sheaves, suitable cable guards 75 are provided. Each guard 75 comprises a center plate portion overlying and closely adjacent to the periphery of the set of coaxial sheaves leading to a corresponding pair of cables. This plate prevents the cables from coming out of the sheaves. However, it itself would ordinarily provide an abrupt shoulder from the top of its upper face to the top face of the boom. To eliminate such shoulder, small ramps 76 are provided on the arms 5 of the boom adjacent the ends of the plates 75. These ramps slope from the top of their plates 75 in opposite directions downwardly substantially to the plane of the top of the boom. Accordingly, when moving the truck with the boom close to the ceiling, there is no abrupt exposed shoulder above the boom to catch onto the ceiling. Instead, any part of the ceiling engaged would be gradually engaged by the ramps 76 and caused to ride up and over the plate 75 if there is sufficient give in the part engaged, or to wedge the boom against the part of the ceiling by an upward force rather than striking it a blow from the side.

In the case of such wedging, it may be possible to tighten up on the stack of tires to gain a slight amount more of clearance at the floor so the boom can be lowered slightly and either backed out of place or pushed entirely into place as the case may be. Generally it is preferred to back out of the space, release the stack of tires and pick them up part at a time.

Since there is no flange on the bottom of the grippers which has to be precisely positioned to pass under the bead of a tire, breaking up of the stacked load by engaging some tire, intermediate the top and bottom of the stack, which is selected to be the bottom tire of the particular lift or load, can be readily accomplished without danger of damaging the beads of the selected tire by any flange or protuberance on the shoe and without requiring as precise a vertical positioning of the head as is required by flanged shoes.

Having thus described my invention, I claim:

1. A lift attachment for lifting articles having central openings and comprising a frame;
a boom support thereon;
a lift head including a rigid body and at least three weight supporting shoes;
substantially upright pivot means pivotally connecting the shoes, respectively, to the body in spaced relation to each other about an upright central axis for swinging movement in substantially horizontal paths spaced about said axis outwardly from the axis to an extended position and inwardly toward the axis to a retracted position;
flexible hoisting cables depending from the support and connected to the shoes, respectively, in outwardly spaced relation to the pivot means, each cable for movement of its point of connection outwardly and inwardly relative to the central axis of the head with its associated shoe upon movement of its associated shoe to extended and retracted positions, respectively;
power operable means for paying out the cables concurrently for lowering the head and for retracting the cables concurrently for lifting the head;
guide means mounted on the support and engaging the cables, respectively, at the points of dependency of the cables from the support;
said guide means being spaced outwardly from an upright central axis and spaced apart from each other circumferentially of said central axis, so that, when the head is freely suspended by the cables, each cable, between its point of connection with its associated shoe and its point of dependency, is generally upright when the shoes are in extended position;
said head, when the shoes are in retracted position, being receivable through the central openings of the articles by lowering the head axially through their central openings while the articles are supported in a stack with the axes of their central openings upright;
each shoe having an outwardly facing gripping face, the gripping faces of the shoes being positioned so that in extended positions of the shoes the faces can engage with the peripheral wall of the central opening of any selected one of the articles in which the head is disposed and when in retracted position of the shoes can release from said peripheral wall;
reversible piston and cylinder assemblages carried by the body and connected to the shoes for driving the shoes to and from said positions selectively;
a reversing valve common to all of the assemblages for connecting all of the assemblages concurrently to a source of fluid pressure for admitting pressure fluid to the assemblages in the same selected direction, concurrently;
characterized in that each of said assemblages is connected to a different one of the shoes;
hydraulic flow regulators are connected to the assemblages, respectively, and meter the volume of fluid admitted to the assemblages, in the direction of flow of fluid for moving the pistons of the assemblages for extending the shoes, so that each one of the assemblages receives the same amount of fluid and thereby constrains the assemblages to move the shoes from contracted to extended position concurrently at the same rate.

2. The structure according to claim 1 wherein connectors interconnect the cables to the shoes, respectively, so that each cable can swivel about a generally upright axis and rock about the generally horizontal axis relative to its associated shoe.

3. The structure according to claim 2 wherein each connector includes two members of which one is fixedly connected to the cable and the other is anti-frictionally connected to the shoe for retracting with the shoe about said upright axis, and one of said members is pivotally connected to the other of said members for rocking about said horizontal axis.

4. The structure according to claim 1 wherein said cables extend endwise of the support, four shoes are carried by the head and arranged two at the inboard side of the head facing the support and two at the outboard side of the head facing away from the support;
- the cables for the shoes at the inboard side lie in a predetermined plane, the cables for the shoes at the outboard side lie in a plane generally above said predetermined plane, the inboard cables depend from sheaves;
- the outboard cables pass over sheaves, respectively on the support outwardly endwise of the support from the points of dependency of the last mentioned cables from the support, and thence downwardly and around associated outer sheaves and back toward the frame to additional sheaves from which they depend; and
- said additional sheaves are on the same level as the first mentioned sheaves.

5. The structure according to claim 1, wherein sheaves are provided on the support for guiding the cables where they extend endwise of the support, transverse guide plates are connected to the support, each plate overlies, with operating clearance, a group of coaxial sheaves for preventing the cables of said group from becoming detached therefrom; and skid ramps are mounted on the top of the support at the sides, respectively, of each plate and slope downwardly from the upper surface of their associated plate in opposite directions endwise of the support substantially to the top of the support.

References Cited

UNITED STATES PATENTS

| 2,823,948 | 2/1958 | Horton | 294—97 |
| 3,195,751 | 7/1965 | Meyers | 214—658 X |

FOREIGN PATENTS

| 204,078 | 6/1907 | Germany. |
| 712,195 | 7/1954 | Great Britain. |

GERALD M. FORLENZA, Primary Examiner

GEORGE F. ABRAHAM, Assistant Examiner

U.S. Cl. X.R.

214—658; 294—97